(12) United States Patent
Tirler et al.

(10) Patent No.: US 11,851,728 B2
(45) Date of Patent: Dec. 26, 2023

(54) METHOD FOR THE TREATMENT OF ACCUMULATORS, BATTERIES AND THE LIKE

(71) Applicant: Eco-Research, Bolzano (IT)

(72) Inventors: Werner Tirler, Bolzano (IT); Giulio Voto, Bolzano (IT); Marco Palmitano, Bolzano (IT); Fritz Mödinger, Bolzano (IT)

(73) Assignee: ECO-RESEARCH, Bozen Bolzano (IT)

( * ) Notice: Subject to any disclaimer, the term of this patent is extended or adjusted under 35 U.S.C. 154(b) by 80 days.

(21) Appl. No.: 17/626,835

(22) PCT Filed: Jul. 15, 2020

(86) PCT No.: PCT/EP2020/069946
§ 371 (c)(1),
(2) Date: Jan. 13, 2022

(87) PCT Pub. No.: WO2021/009199
PCT Pub. Date: Jan. 21, 2021

(65) Prior Publication Data
US 2022/0275474 A1  Sep. 1, 2022

(30) Foreign Application Priority Data
Jul. 17, 2019  (IT) .................. 102019000012060

(51) Int. Cl.
*C22B 1/00* (2006.01)
*C22B 7/00* (2006.01)
*H01M 10/54* (2006.01)

(52) U.S. Cl.
CPC .............. *C22B 1/005* (2013.01); *C22B 7/006* (2013.01); *H01M 10/54* (2013.01)

(58) Field of Classification Search
None
See application file for complete search history.

(56) References Cited

U.S. PATENT DOCUMENTS

| 2013/0247721 A1 | 9/2013 | Kudo et al. |
| 2013/0300226 A1 | 11/2013 | Wang et al. |

(Continued)

FOREIGN PATENT DOCUMENTS

| CN | 105304966 | 2/2016 |
| CN | 105655663 | 6/2016 |

(Continued)

OTHER PUBLICATIONS

International Search Report.
(Continued)

*Primary Examiner* — Scott R Kastler
(74) *Attorney, Agent, or Firm* — Jacobson Holman PLLC

(57) ABSTRACT

A method for processing accumulators, batteries and the like, which contain lithium, lithium ions, sodium, potassium and/or nickel as active components. According to the invention, the following steps are carried out; —introducing an accumulator, a battery, cell or the like, that contains lithium, lithium ions, sodium, potassium and/or nickel, into a chamber/reactor (13,23); —introducing water (H2O) (B, B2) in to the reactor (13,23); bringing the content of the reactor (13) to a temperature between 120° C. and 370° C. at a pressure between 2 and 250 bar.

5 Claims, 2 Drawing Sheets

(56) References Cited

U.S. PATENT DOCUMENTS

| | | | |
|---|---|---|---|
| 2015/0080630 A1* | 3/2015 | Dunagan | B01D 53/1425 |
| | | | 588/318 |
| 2016/0063294 A1 | 3/2016 | Du et al. | |
| 2017/0012328 A1* | 1/2017 | Dunagan | H01M 10/0525 |
| 2022/0275474 A1* | 9/2022 | Tirler | C22B 1/005 |

FOREIGN PATENT DOCUMENTS

| | | |
|---|---|---|
| DE | 102015200653 | 1/2016 |
| EP | 3087208 | 10/2017 |

OTHER PUBLICATIONS

Kim et al. "Simultaneous separation and renovation of lithium cobalt oxide from the cathode of spent lithium ion rechargeable batteries" Journal of Power Sources, vol. 132, No. 1-2, May 20, 2004, pp. 145-149.

Xu et al. "A review of processes and technologies for the recycling of lithium-ion secondary batteries." Journal of Power Sources, vol. 177, No. 2, Jan. 14, 2008, pp. 512-527.

\* cited by examiner

METHOD FOR THE TREATMENT OF ACCUMULATORS, BATTERIES AND THE LIKE

BACKGROUND OF THE INVENTION

The invention relates to a method for treating accumulators, batteries and the like, which may contain lithium, lithium ions, sodium, potassium and/or nickel as active constituents, and to a system for carrying it out.

Due to the increasing use of rechargeable batteries and accumulators, the problem of recycling and treatment of the same at the end of the life cycle and the recovery of the organic components, the polymers and the metals is increasing.

Especially with the ever increasing appearance of land vehicles driven by electric motors, batteries/accumulators of large dimensions and with electrical power, which result from the assembly of individual units, are used more and more frequently. The recycling of this type of accumulators, batteries, cells and the like after the end of their life cycle leads to high costs and a high expenditure of resources and energy for transport and/or handling costs, since the recycling processes can also be dangerous or must be classified within the scope of the so-called "Seveso Directive" CE 1996/82.

A large number of different recycling processes for accumulators, batteries and cells of this type are known. A method for recovering lithium cells and/or lithium batteries is known from DE 10 2015 200 653. To recycle the lithium cells and/or lithium batteries, they have to be destroyed by a mechanical process using ice water and the components dissolved in the water are separated off by means of a chemical process.

The residues from the process mentioned are incinerated and at least one carbonate is advantageously added to the water in order to separate lithium carbonate from the mixture. This described method creates a number of problems, since it does not allow the proper separation of the resources that one wants to recover, moreover a mechanical processing is required, which is especially dangerous with charged batteries because of the possibility of potential danger of explosion and the release of harmful toxic substances.

From EP 3 08 72 08, a method for the recovery of energy and metals from batteries is known, which is carried out in a furnace for melting copper, comprising the following steps:

Addition of a charge that can be used for the residue-binding elements in the melting furnace, addition of heat and of reducing agents, wherein at least part of the heat and/or the reducing agents being replaced by batteries containing lithium, lithium ions, comprising metals with iron, aluminium and plastic. This process also requires mechanical treatment of the batteries before processing. The process is also carried out at high temperatures and there are significant risks as the batteries could explode or cause other damage and the batteries must be discarded prior to treatment as they must not contain certain substances, such as cobalt, which may not exceed a threshold.

From PCT US 2016 06 32 94, a method for recycling batteries with lithium ions is known in which the molar ratio for the cathode material for a new battery must be determined and this solution for the new battery is formed by crushed old batteries that are treated with an acidic agent and hydrogen peroxide to separate the solution from the undissolved material.

The above-mentioned method also requires mechanical processing and chemical treatment in order to obtain a product that is not identical to the initial product, but as a remedy to reuse the raw material resources used in the manufacture of the lithium/ion batteries.

US 2013 030 22 26 also describes a method in which the lithium ion batteries are shredded and then treated by a chemical process. This method has the same problems already described in the previous publications.

CN 10 56 55 663 describes a process in which the individual parts of the lithium ion batteries are dismantled using individual dismantling steps and then an attempt is made to regain the resources used in this way. This process is also particularly time-consuming and risky because of the work with material that is used to manufacture batteries and that could react with the environment and/or be harmful to people.

CN 10 5304 966 describes a method in which a lithium ion battery is immersed in a hot liquid after the housing in which the battery is received has been removed, and the membrane is melted by heating the liquid to a high temperature. The positive material was separated from the negative material via a current collector with a positive electrode and vice versa. The hot liquid is dissolved in water. The positive material and the negative material are then filtered. In this process also an external energy supply is required to bring everything to a high temperature: in this case with a temperature up to the melting of aluminium, wherein the mass of lithium and cobalt remains stable at a temperature of approx. 100 degrees Celsius. The graphite is carbonized into a carbon dioxide gas at the same temperature. This method also requires mechanical treatments at high temperatures and the raw material must advantageously be separated from the residues obtained in this way.

All of the above-mentioned methods require special conditions for the selection and processing treatments of the recycled material and, moreover, are laborious, since they often require a high temperature and in general have the possible problem of the release of dangerous substances into the environment.

SUMMARY OF THE INVENTION

When processed in an aqueous/moist phase, the method according to the invention does not produce any emission of toxic and potentially corrosive smoke gases, a problem not addressed in the inventions of the prior art mentioned, but rather causes the steps that could lead to the emission of potentially dangerous substances to react with the liquid/moist environment.

This makes the process subject of the invention safe under the environmental profile both for that which concerns potential emissions to the atmosphere during the treatment step as well as the residues of potentially toxic substances that could possibly contaminate the parts intended for recycling or as raw material in optics of the end-of-waste in accordance with the CE 2008/82 directive.

At the end of the process according to the invention, a residue is obtained that has lost chemical reactivity (and dangerousness) and is intended for the hydrometallurgical recovery of the materials present in the battery (for example Li, Co, Ni, Mn, other metals and also Fluorine).

Batteries in the present description are understood to be any batteries, accumulators, electrically chargeable cells and all means that are useful for storing electrical energy.

The object of the present invention is to obtain materials via the process which can be added to a metallurgical recovery or recycling process.

This object is achieved by a method according to the claims.

The method consists of the following steps:

Insertion of an accumulator, battery, cell or the like, which can contain lithium, lithium ions, sodium, potassium and/or nickel, into a chamber/reactor, Addition of demineralized water ($H_2O$) or simple industrial tap water (depending on the subsequent treatments).

Everything with a temperature above 100° C. and below 370° C. with a pressure between 2 and 250 bar.

The pretreatment to a temperature below 250° C. is particularly advantageous, since below this temperature most of the organic polymers of various compositions contained in the cell/battery/accumulator are not damaged, whereby the recovery of the materials is facilitated.

Advantageously, cables, external non-essential metal supports and plastics, etc. are removed prior to treatment.

In a further embodiment, the treatment can be carried out directly on the cells/batteries/accumulators without resorting to the process of removing cables, external metal supports and plastic parts.

After the mass to be treated, composed of batteries, accumulators and the like, has been introduced into the reactor, water is added and the temperature is increased for hydrothermal treatment. The temperature is advantageously brought up to approx. 200° C. to 220° C. Under these operating conditions, the breakdown of the separator between the anode and cathode is observed and the battery is short-circuited and loses its residual electrical charge, causing an exothermic reaction with a consequent increase in temperature and pressure inside the chamber (reactor). The active material contained in the battery (for example lithium) hydrolyses quickly, forming compounds that are no longer dangerous. The presence of $H_2O$, i.e. a humid environment, limits the temperature increase in the battery body, which could lead to the breakdown of the plastic parts. The humid environment weakens the temperature fluctuations and the humid environment binds the aggressive substances that break free from the battery. In this way, dangerous chemical reactions and the escape of toxic gases can be avoided.

Water is necessary for all these processes and it has to be added in sufficient quantity into the reactor. The amount of water compared to the batteries/accumulators to be treated is preferably from a weight ratio of 1/1 to 10/1.

At the end of the process, the chamber/reactor is cooled down and the materials, in particular cobalt, magnesium, iron, aluminium and can be recovered via the hydrometallurgical path.

This method also allows subsequent recycling in a simple and safe manner, avoiding any dangerous exothermic and/or chemical reactions which can cause serious harm to people. Since there are no longer toxic gases present, the management of the chamber/reactor where the recycling processes are carried out does not have to be subjected to strict inspection plans and be equipped with precipitation systems in order to remove the dangerous gases from the released gases. The batteries, accumulators or the like treated with this method can moreover be transported in this way without any danger after the treatment. This is a significant advantage as, for example, electric car batteries also have considerable dimensions and must be accommodated in special containers which are able to withstand possible exothermic reactions in order to eliminate hazards during transport.

The transport of such batteries without treatment would require a large amount of space and lead to high costs.

For a battery/accumulator, treated with this method according to the invention these problems no longer exist and it can be transported easily and more economically.

Thanks to the relatively low temperatures and pressures used, numerous hazards typically found in thermal destruction processes are avoided.

In a preferred embodiment, the reaction chamber is flooded with inert gas before the battery to be treated is introduced in order to avoid possible reactions with compressed air or with other gases present, in particular with oxygen.

In order to ensure the proper operation of the method according to the invention, $H_2O$ must advantageously be added between 1 and 10 times the weight of the batteries, accumulators and the like to be recycled. The amount of $H_2O$ to be added is depending on the type of batteries, accumulators to be recycled. For safety reasons, a larger amount of $H_2O$ is required if there are substances inside the batteries that could release hydrofluoric acid or chloric acid. These acids are particularly dangerous in gas form. If a sufficient amount of H2O is present, these react and form an aqueous solution: for example $H3O^++F^-$ or $H3O^++Cl^-$.

In aqueous form these types of chemicals are easy to handle and with the addition of a base to correct the pH they become even less dangerous/inert.

DESCRIPTION OF THE DRAWINGS

An example of the method according to the invention is described below in a non-restrictive manner by means of an attached diagram, wherein.

DETAILED DESCRIPTION OF THE INVENTION

Figure 1:
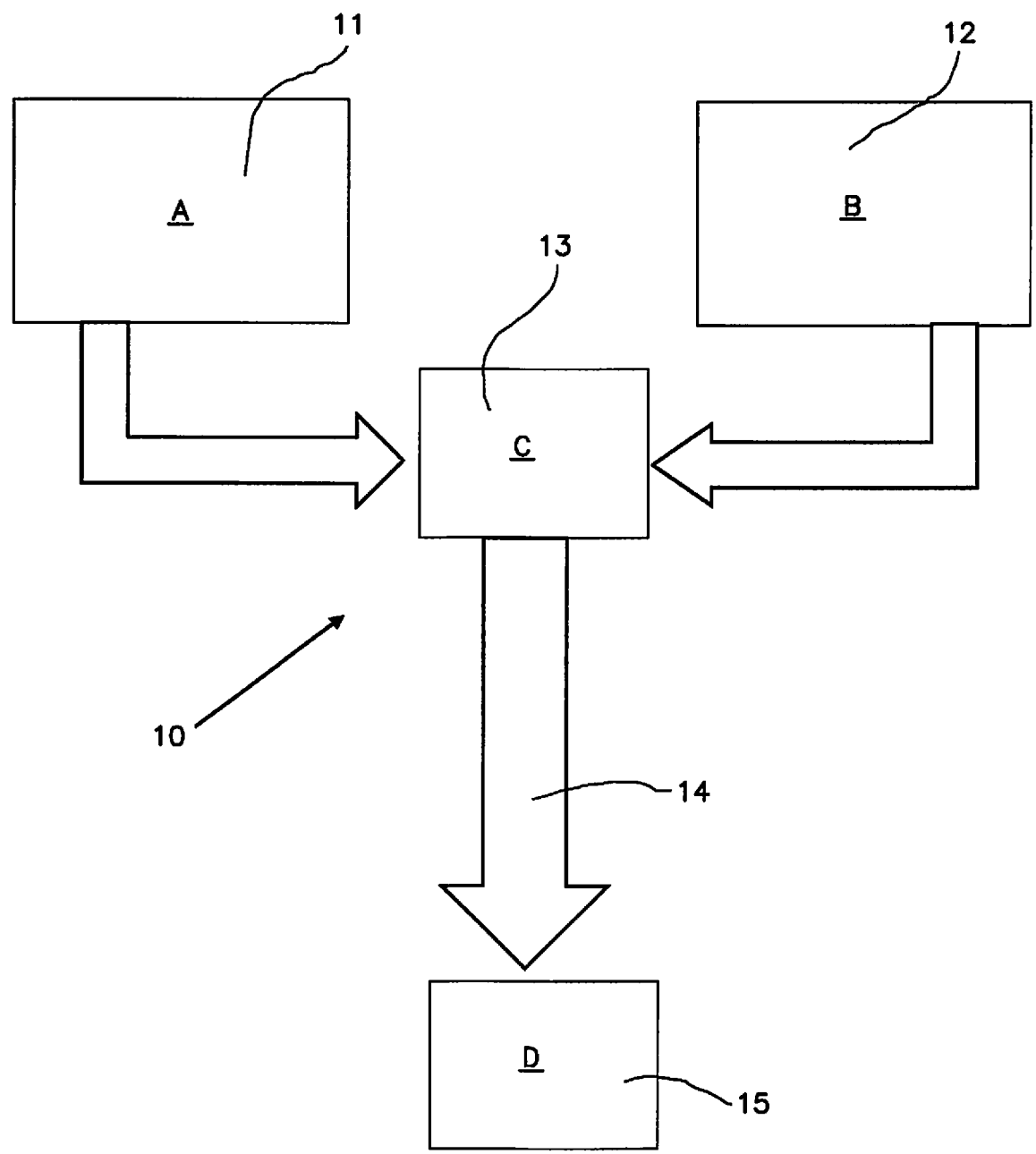
FIG. 1 shows a process scheme according to the invention.

In FIG. 1, the reference number 10 indicates a method according to the invention. Reference number 11 indicates a mass A which is formed by batteries, accumulators, charging cells and the like to be recycled. A compound B, which is usually water 12, is then also introduced into this mass A and, in a preferred embodiment, an inert gas can also be added. A and B form the mass C.

The amount of water $H_2O$ is advantageously determined as a function of the mass of batteries, accumulators, charging cells or the like to be treated. In order to have enough $H_2O$ available during the treatment process, $H_2O$ is added from 1 to 10 times more than the weight A of the batteries to be treated in the water.

The reactive chemical substances, for example chloric acid and hydrofluoric acid, are bound by water vapour and liquid water. These chemical substances bind with water and form aqueous solutions that are easier to handle than their gaseous compounds.

The mass C is heated within the reactor 13 by bringing the temperature between 120 and 370° C. Depending on the temperature, the pressure inside the reactor reaches from 2 to 250 bar. The temperature is advantageously kept below 250° C. and the pressure below 40 bar. When reaching a temperature of approx. 220° C. in the reactor and a pressure of approx. 25 bar, the membrane and/or the separator between the anode and the cathode collapses for most of the batteries, accumulators, charging cells and the like and leads the to a short circuit in the battery, the accumulator, and the charging cells. As a result of this short circuit, an increase in temperature is also displayed. As products of the reaction between batteries/accumulators and water under the conditions mentioned, hydrogen ($H_2$), light hydrocarbons, $CO_2$ and CO can develop with a content that changes depending on the state of charge of the batteries/accumulators.

The greater the state of charge of the batteries to be treated, the more $H_2$ and light hydrocarbons can be developed. It is possible to use the developed gases by recovering the hydrogen ($H_2$) or, for example, to feed a thermal engine with the resulting gases to generate electrical energy.

In order to stabilize the reaction within the reactor, acids or bases can be added to buffer the pH levels.

Figure 2:
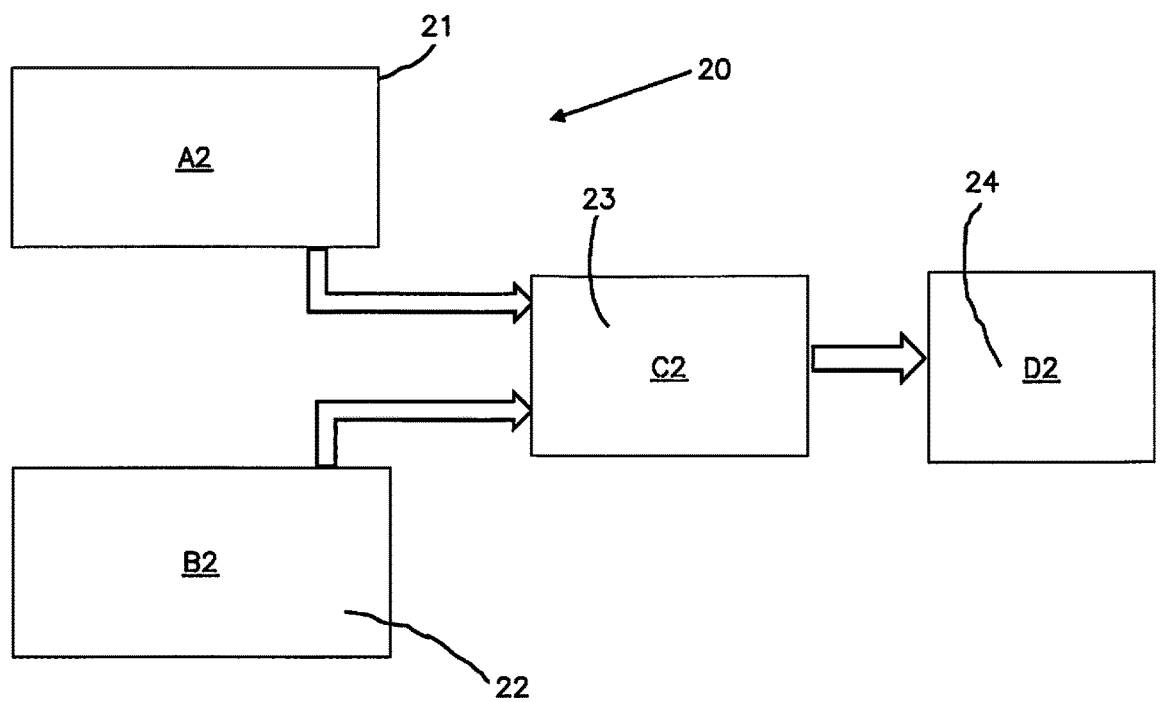
FIG. 2 shows a second process scheme according to the invention.

FIG. 2 shows a continuous process 20 for the treatment of batteries to be recycled, in which the charge A2 21 is fed within a reactor 23 and water and preferably also inert gas B2 designated by the reference number 22 are added to the reactor. The continuous supply has the advantage that the reactor 23 is already at the desired temperature and at the desired pressure. In order to maintain the pressure within the reactor 23, screw conveyors and/or conveyors with check valves can be provided which maintain the pressure within the reactor 23. In order to monitor and dose the correct amount of water, sensors (temperature, pressure, pH) may be arranged inside the reactor 23, which allow the setting of a possible addition of water or inert gas.

The gases generated inside the reactor can be used to generate thermal energy to help keep the process at the necessary temperature. After the process 20, the treated materials can be sorted, separated and recycled. The process described in this way can also be used as a pre-treatment process for the recycling of the material in question. With the process according to the invention, the costs for the transport and handling of the exhausted batteries/accumulators decrease significantly, since the potential risk of fire and explosion is eliminated.

The variants of the method described above are only used for a better understanding of the process, the mode of operation and the properties of the solution presented. They do not limit the disclosure of the exemplary embodiments. The figures are schematic, with properties and essential effects in some cases being clearly enlarged in order to emphasize the functions, the process principles, configurations and technical features. This means that every mode of operation, every principle, every technical embodiment and every feature that is disclosed in the figures or in the description can be used freely and in any manner combined with all patent claims, every feature in the description and in the other figures, other modes of operation, principles, configurations and technical features contained in this disclosure or result from it in such a way that all conceivable combinations can be attributed to the solution described. This also includes combinations between all the individual versions in the description, e.g. in each paragraph of the description, in the claims and also combinations between different variants in the description, in the dimensions and in the figures. The device and method details presented above are shown interrelated: it should be pointed out, however, that they can be combined with one another independently of one another and one can freely be combined with the other. The relationships of the individual parts and their sections between one another and their dimensions and proportions shown in the figures are not to be understood as limiting. Individual dimensions and proportions can also differ from those shown. The patent claims also do not limit the disclosure and therefore not the possible combinations of all the features presented. All the features presented are also disclosed individually and in combination with all other features.

LIST OF REFERENCE NUMBERS

10 Method according to the invention
11 Mass A of accumulators etc. to be recycled
12 Water and inert gas B
13 Reactor of mass A and gas B
14/15 Final product of process D
21 Mass A2 of accumulators etc. to be recycled
22 Inert gas B2
23 Reactor of mass A2 and gas B2
24 Final product of process D2
C Mass in the reactor 13
C2 Mass in the reactor 23

The invention claimed is:

1. A method for the treatment of accumulators, batteries, cells, which contain lithium, lithium ions, sodium, potassium and/or nickel as active components, comprising the following steps:
   Insertion of an accumulator, battery, cell, containing lithium, lithium ions, sodium, potassium and/or nickel, into a reactor,
   Insertion of water into the reactor,
   Raising the contents of the reactor to a temperature between 120° C. and 370° C. with a pressure between 2 and 250 bar.

2. The method according to claim 1, wherein inert gas is also introduced into the reactor with the water.

3. The method according to claim 1, wherein the contents of the reactor are raised to a temperature of at least 200° C. and to a minimum pressure of 16 bar.

4. The method according to claim 1, wherein the contents of the reactor are raised to a temperature of a maximum of 250° C. and to a maximum pressure of 40 bar.

5. The method according to claim 1, wherein the ratio of water to the batteries/accumulators/cells to be treated is 1/1 to 10/1 by weight.

* * * * *